Oct. 24, 1967 R. E. BUSCH 3,348,769

CONTROL MECHANISM FOR CALCULATING MACHINE

Filed Aug. 11, 1964 14 Sheets-Sheet 1

INVENTOR.
RICHARD E. BUSCH
BY Charles R. Miranda
ATTORNEY

Oct. 24, 1967 R. E. BUSCH 3,348,769
CONTROL MECHANISM FOR CALCULATING MACHINE
Filed Aug. 11, 1964 14 Sheets-Sheet 2
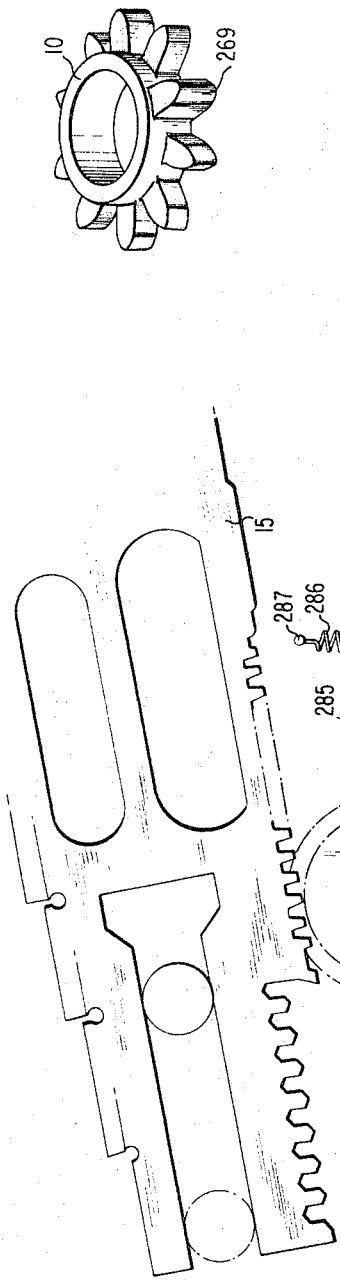
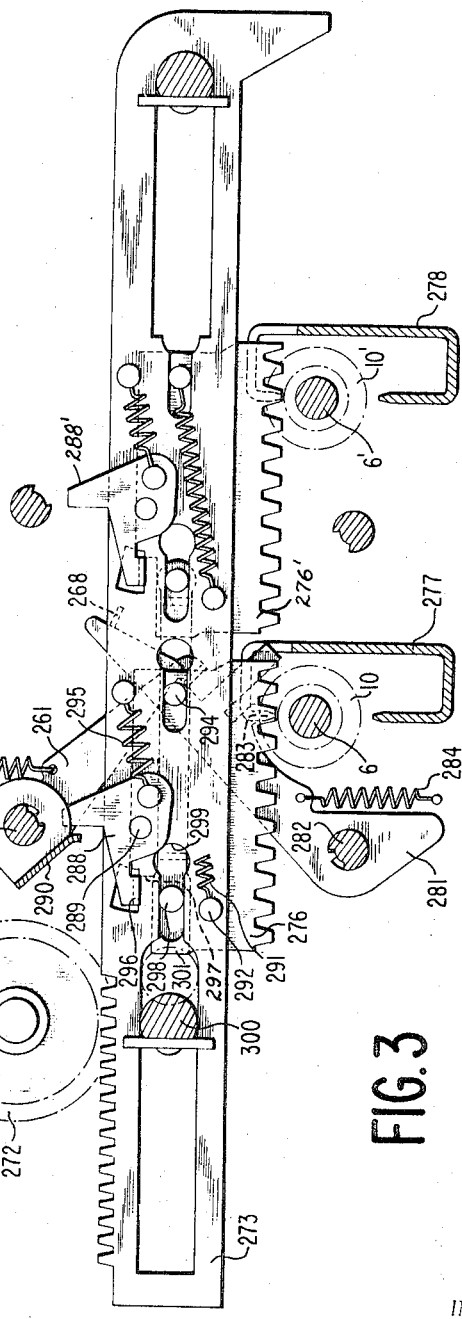
INVENTOR.
RICHARD E. BUSCH
BY Charles R. Miranda
ATTORNEY

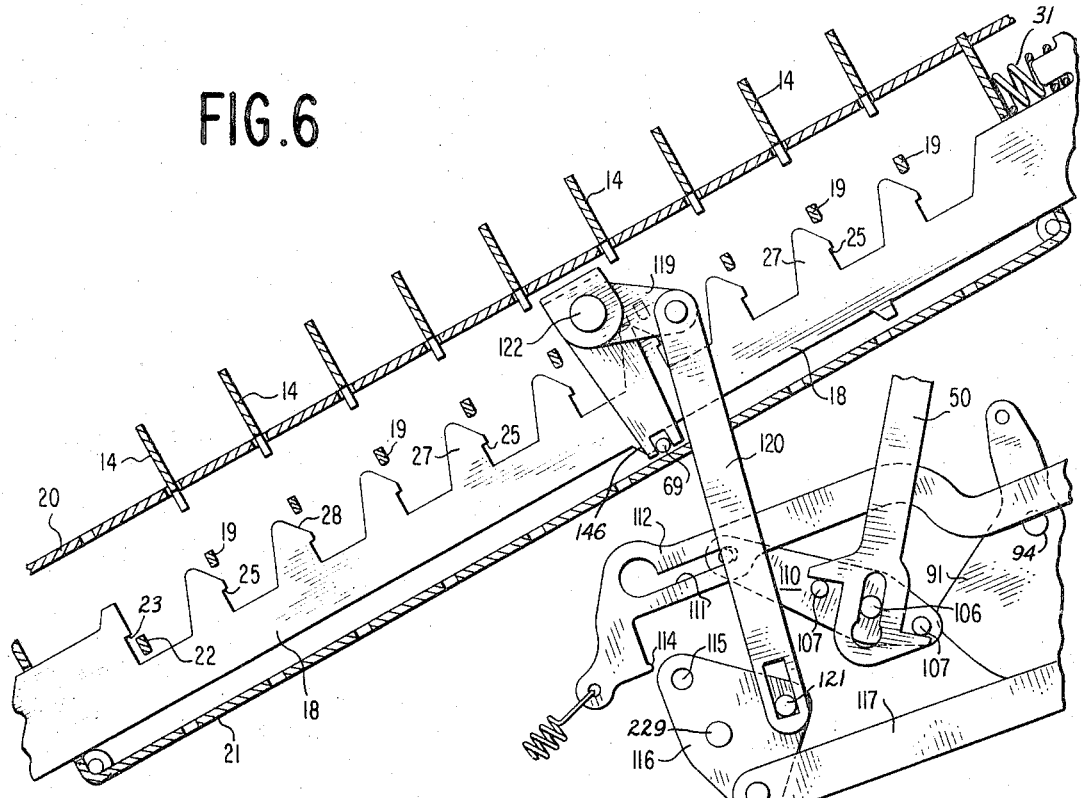
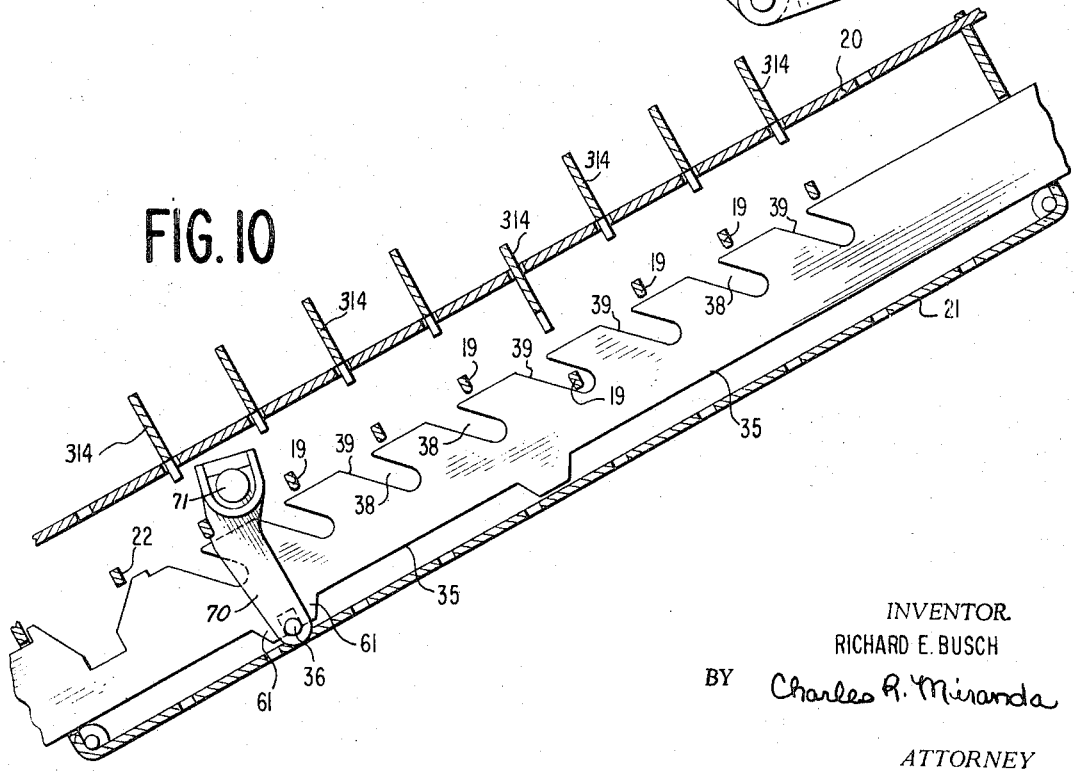

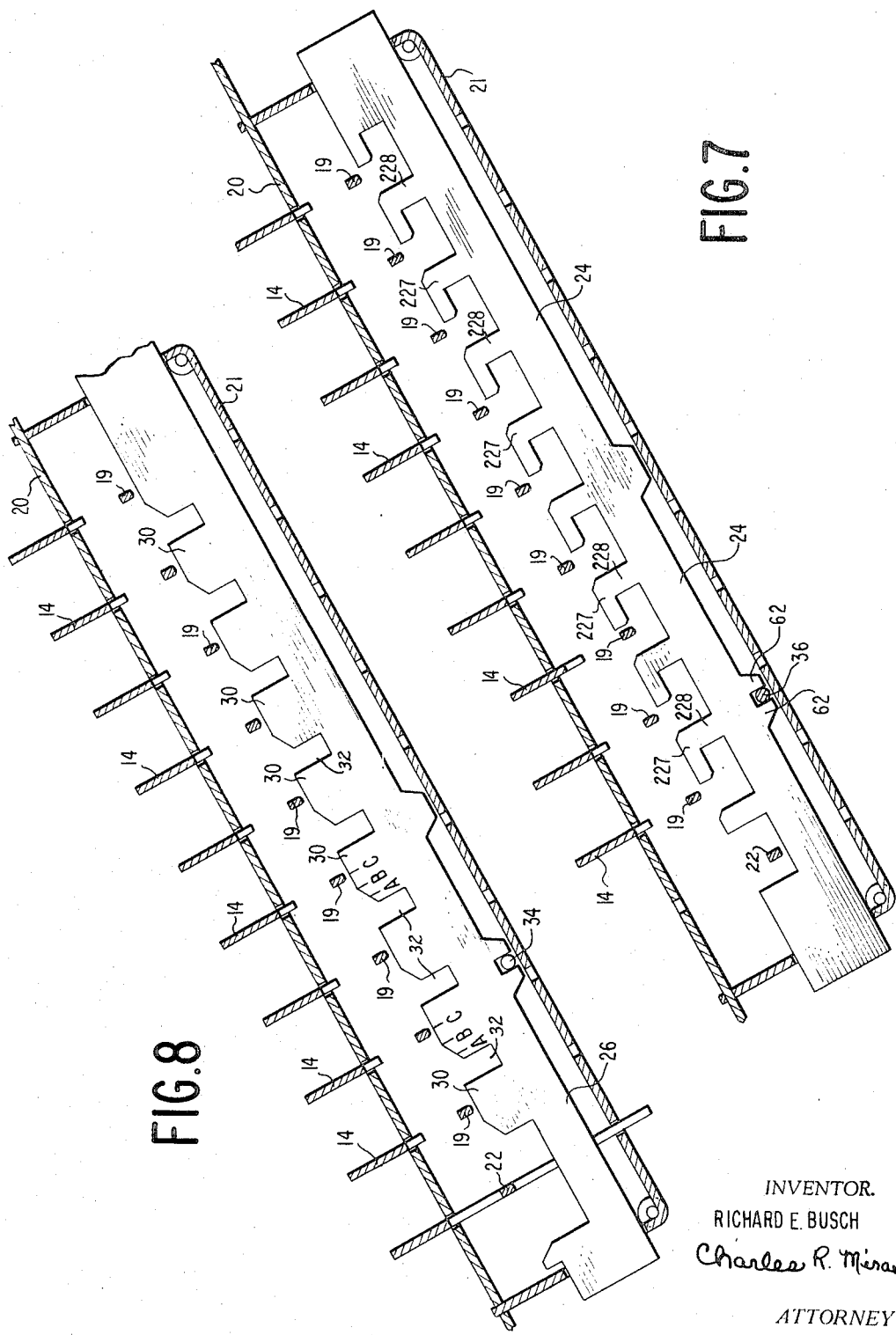

Oct. 24, 1967　　　　　　　R. E. BUSCH　　　　　　3,348,769
CONTROL MECHANISM FOR CALCULATING MACHINE
Filed Aug. 11, 1964　　　　　　　　　　　　　14 Sheets-Sheet 6
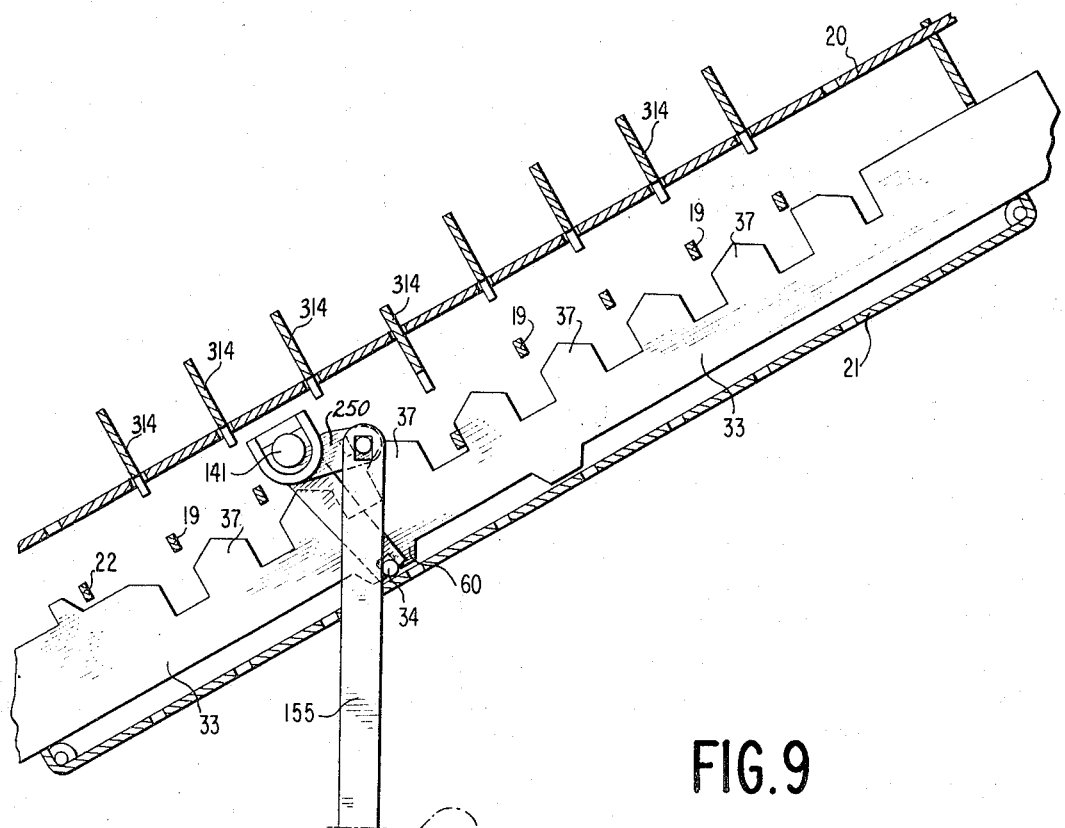
FIG. 9
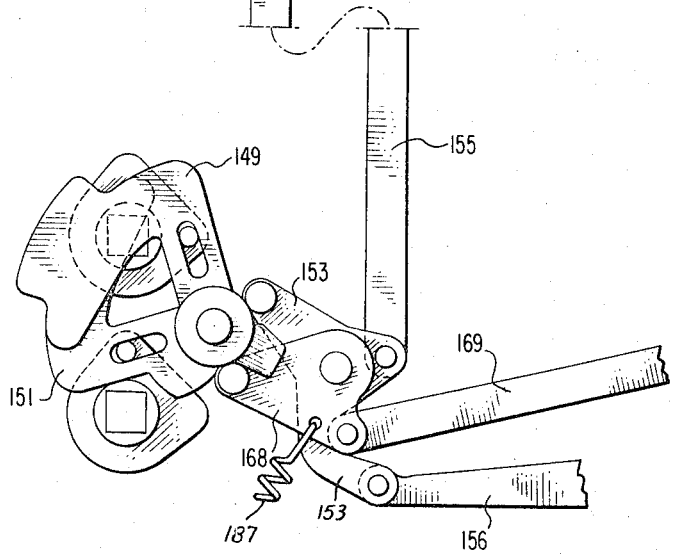
INVENTOR.
RICHARD E. BUSCH
BY Charles R. Miranda
ATTORNEY Oct. 24, 1967  R. E. BUSCH  3,348,769
CONTROL MECHANISM FOR CALCULATING MACHINE
Filed Aug. 11, 1964  14 Sheets-Sheet 7
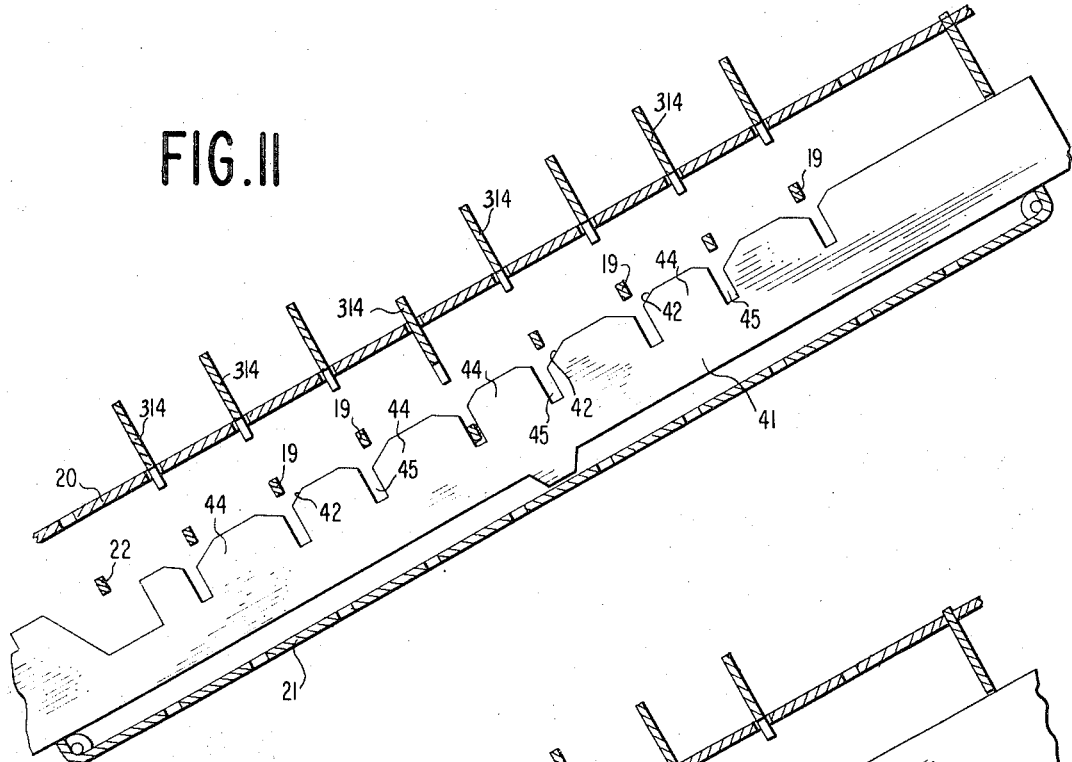
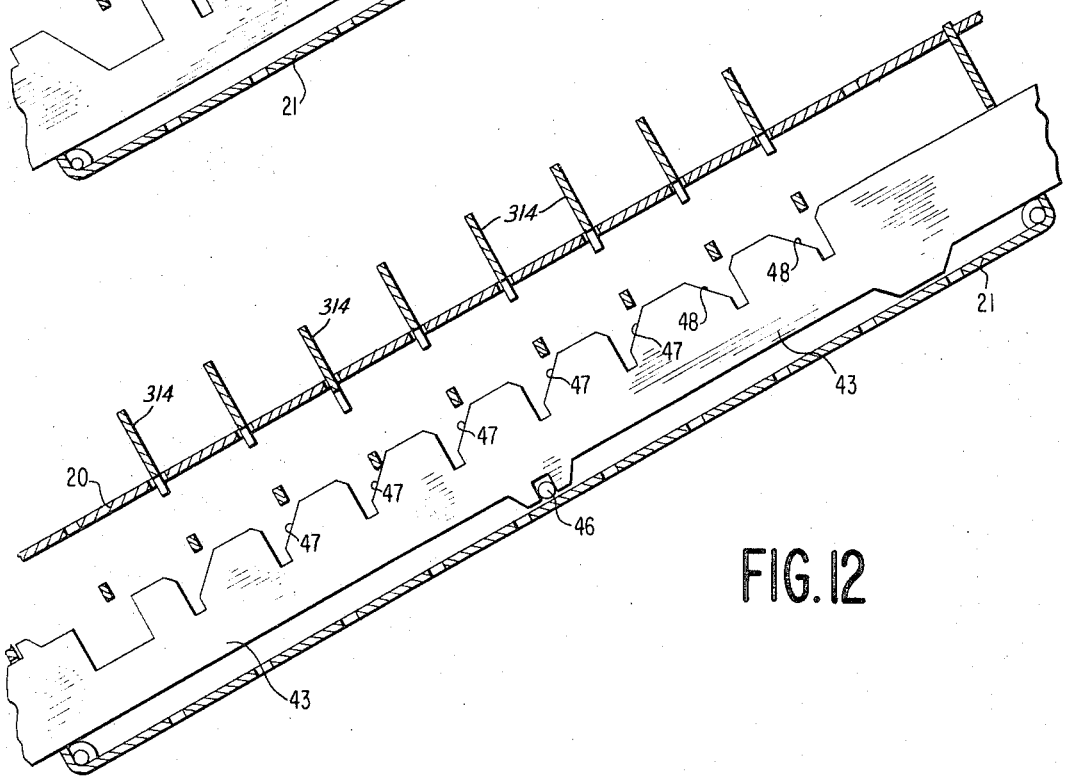
INVENTOR.
RICHARD E. BUSCH
BY Charles R. Miranda
ATTORNEY INVENTOR.
RICHARD E. BUSCH
BY Charles R. Miranda
ATTORNEY

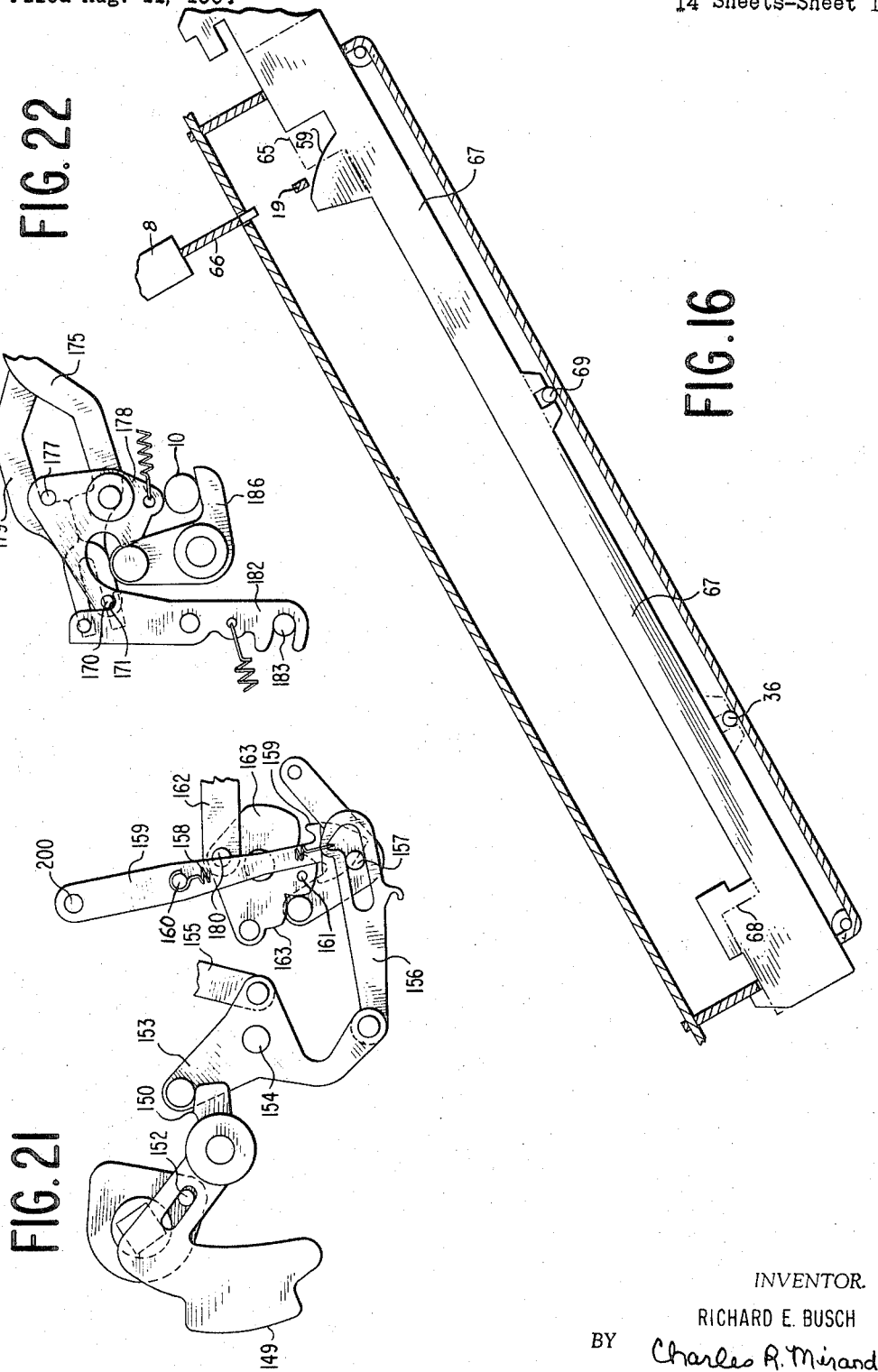

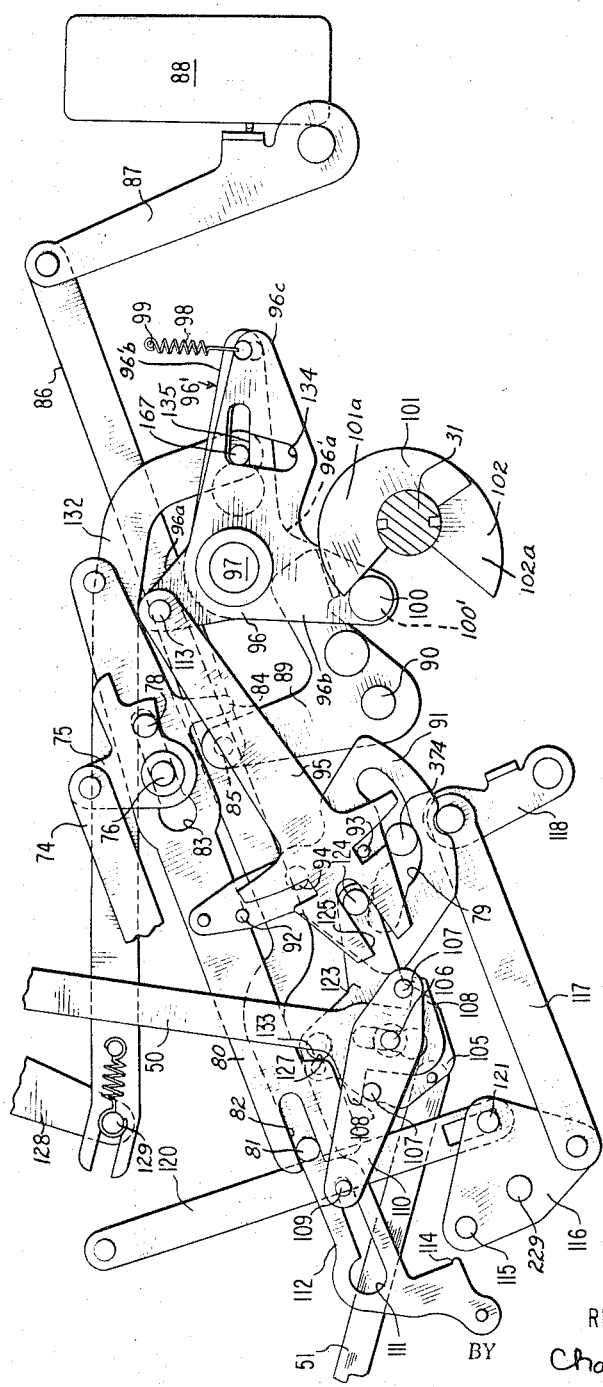

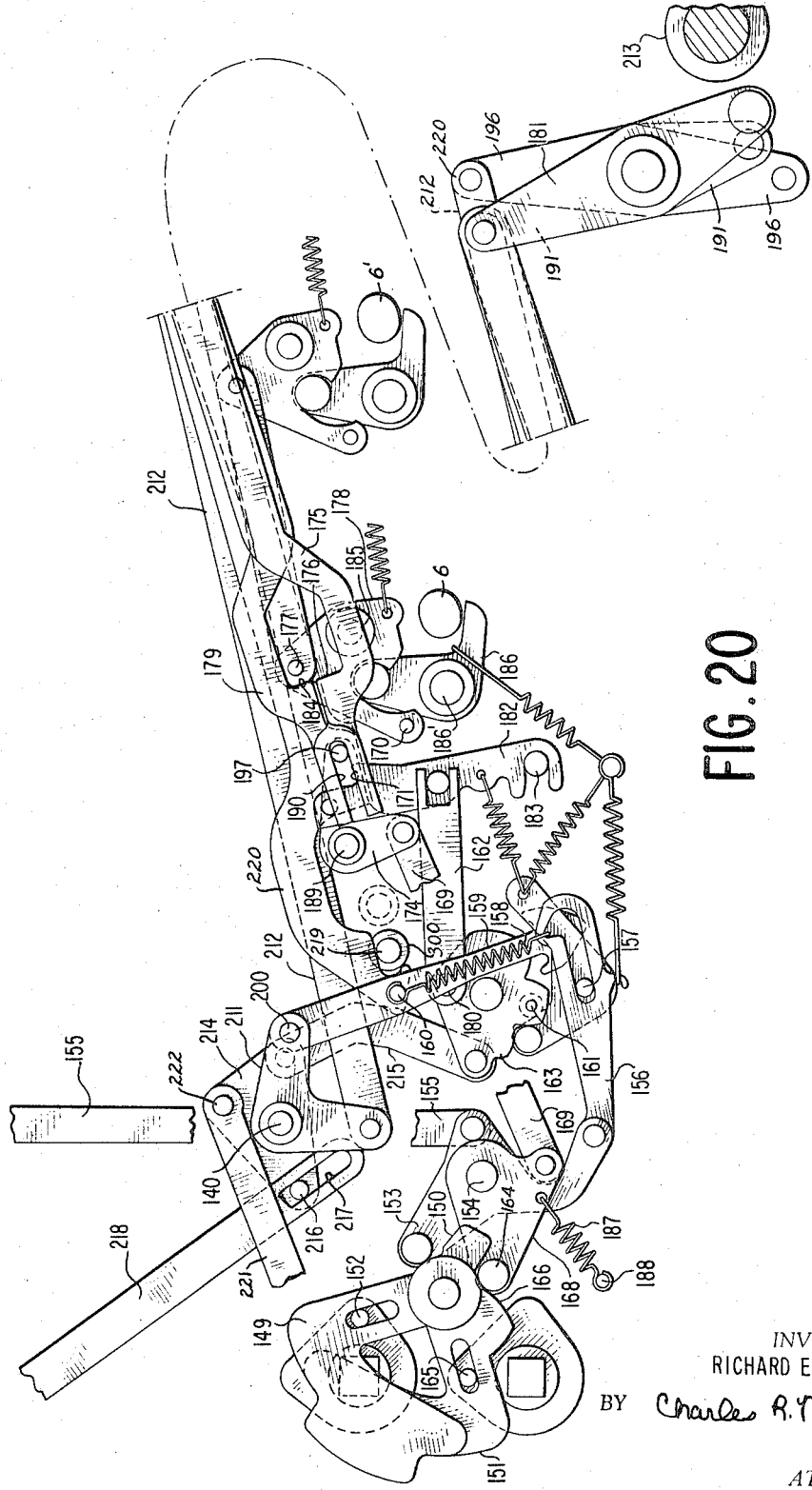

Oct. 24, 1967 R. E. BUSCH 3,348,769
CONTROL MECHANISM FOR CALCULATING MACHINE
Filed Aug. 11, 1964 14 Sheets-Sheet 14

INVENTOR.
RICHARD E. BUSCH
BY Charles R. Miranda

ATTORNEYS

United States Patent Office 3,348,769
Patented Oct. 24, 1967

3,348,769
CONTROL MECHANISM FOR CALCULATING
MACHINE
Richard E. Busch, La Puente, Calif., assignor to Sperry
Rand Corporation, New York, N.Y., a corporation of
Delaware
Filed Aug. 11, 1964, Ser. No. 388,901
3 Claims. (Cl. 235—60)

The present invention relates in general to calculating machines and more particularly relates to a multi-accumulator cash register calculating machine, such as utilized in the business world to facilitate sale transactions.

The calculating machine in accordance with the instant invention is of the type wherein a plurality of main itemizing accumulators are provided which are differentially controlled so as to selectively add or subtract amounts. In addition to these basic features, the machine in accordance with the instant invention additionally includes a plurality of secondary department accumulators which are selectively controlled so as to provide special selective totals or partial totals as desired.

In the normal cash registering machine which provides the standard add and subtract functions and produces totals and subtotals through selective differential digitation of accumulator elements, each individual function of the machine can be effected only through correct manipulation of the proper keys specifically provided for these functions. Not only must the proper keys be actuated in the proper order, but other keys must be locked to insure correct operation of the machine in accordance with the selected function and to prevent possible damage to the machine by improper actuation of non-associated mechanisms.

Proper interlocking between the various mechanisms in cash registering machines to prevent the above-mentioned difficulties has been developed in various forms and to various degrees of sophistication; however, these particular interlocking mechanisms have been somewhat complicated and therefore subject to failure.

The present invention provides a plurality of control slides in the keyboard of the machine and actuated by the keys to initiate and control the various functions and automatically provide the necessary interlocking between the keys and the various mechanisms of the machine to insure proper operation thereof. In addition, the invention provides a novel accumulator positioning mechanism for engaging the secondary department accumulators with their respective drive racks under the control of the keyboard control slides.

It is a primary object of the instant invention to provide a cash register type calculating machine which includes, in addition to the primary differential actuators and accumulators, a plurality of selective secondary departmental accumulators and a novel control and positioning mechanism therefor.

It is an object of the present invention to provide in a machine of the type described increased simplified control for the selection and actuation of accumulators and for controlling the digitation thereof.

It is another object of the instant invention to provide in a machine of the type described control, in accordance with the desired operation, of a plurality of accumulator racks by associated control slides, which provide for simplified and accurate operation of the machine.

It is a further object of the instant invention to provide in a machine of the type described for integral interlocking control during the various functions of the machine so as to provide a high degree of accuracy without complicating the overall operation thereof.

It is still another object of the instant invention to provide control mechanisms for differentially engaging a plurality of secondary accumulators with their respective racks in coordination with control of said main itemizing accumulators.

These and other objects, features and advantages of the present invention will become more obvious from the following description when taken in connection with the accompanying drawings which show, for purposes of illustration only, one embodiment in accordance with the present invention, and wherein:

FIGURE 3 is a side view of the tens transfer which is designed to cooperate with the secondary accumulator positioning mechanism of the instant invention;

FIGURE 4 is a detail perspective illustrating an accumulator element of the type utilized with the mechanism of FIGURE 3;

FIGURE 6 is a side section of the keyboard illustrating a key latch and zero stop control slide;

FIGURE 7 is a side section of the keyboard illustrating a full stroke control slide;

FIGURE 8 is a side section of the keyboard illustrating an amount interlock slide;

FIGURE 9 is a side section of the keyboard illustrating a department interlock slide and its association with part of the mechanism of FIG. 20;

FIG. 10 is a side section of the keyboard illustrating a clutch trip and key hold-down slide;

FIGURE 11 is a side section of the keyboard illustrating a department interlock slide;

FIGURE 12 is a side section of the keyboard illustrating a department itemizer control slide;

FIGURE 16 is a side section of the keyboard illustrating a zero stop control and clear key slide and a clear key locking slide;

FIGURE 19 is an elevational view of the upper or main accumulator positioning and actuating mechanism;

FIGURE 20 is an elevational view of the lower or department accumulator positioning and actuation mechanism;

FIGURE 21 illustrates a portion of the positioning mechanism of FIGURE 20 in an actuated position.

FIGURE 22 illustrates another portion of the positioning mechanism of FIGURE 20 in an actuated position;

The mechanisms which provide for digitation and selection of the secondary accumulators provided in this multi-accumulator machine are as specifically shown and described in copending application Ser. No. 388,-900, in the name of Richard E. Busch, filed Aug.

11, 1964. Other well-known details of the machine not a part of the invention may, for example, take the form disclosed in Robert E. Boyden Patent No. 2,583,810 issued on Jan. 29, 1952, and the Edward P. Drake Patent No. 2,472,696, issued on June 7, 1949, which relate to the well-known Clary adding machine. Therefore, in the interests of clarity, only those portions of the machine which relate to the present invention or cooperate directly therewith will be illustrated and described herein. However, it should be understood that the invention may be equally well applied to other types of calculating and registering machines than disclosed in the above-mentioned patents and patent applications without departing from the spirit and scope of the instant invention.

Figure 1:
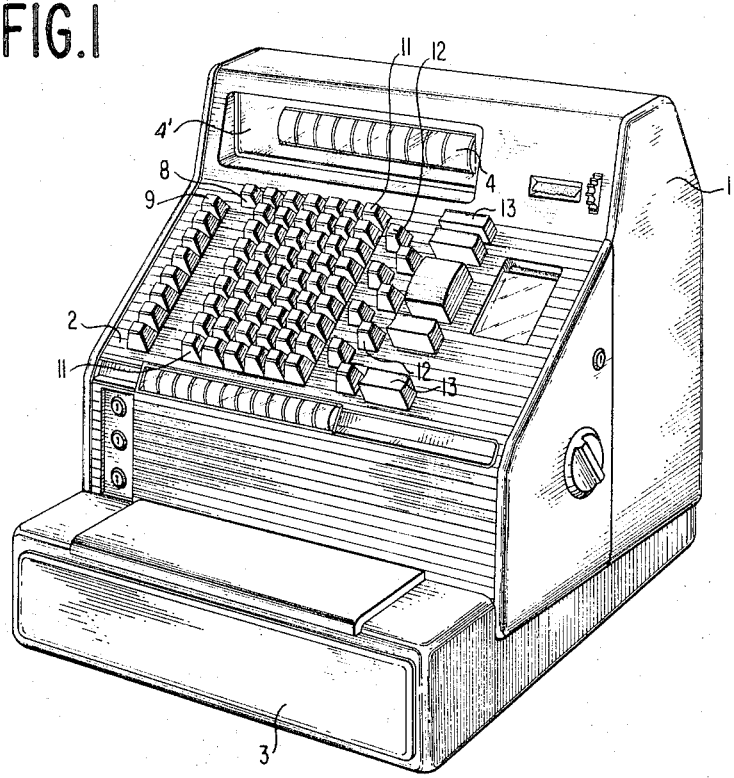
FIGURE 1 is a perspective view of a calculating machine of the type into which the instant invention may be incorporated.

The machine comprises in general, as seen in FIGURE 1, a main cover 1 which includes a keyboard 2 providing the various control keys which effect operation of the machine through desired selected functions. A cash drawer 3 is provided at the lower portion of the machine for retaining cash and other bills, and above the keyboard 2 there is provided a dial system 4 visible through window 4', which indicates the amounts involved in each transaction of the machine along with other pertinent information.

The keyboard 2 contains a first column of keys 9 on the left side thereof which provide for general identification of the operator by means of a letter of the alphabet. No accumulator is provided for this column since no digitation is required for identification. The next column is empty of keys except for an amount release key 8, which controls the depressed amount keys so as to provide selective release thereof without initiating a machine cycle.

Amounts are entered into the machine by way of amount keys 11 which are provided in six columns, each column containing nine keys representing each of the primary digits. Two columns are provided adjacent the amount keys 11 for a plurality of department keys 12, which like the identification keys 9 do not digitize an accumulator but serve to select the type of digitation which will occur in the amount section. The right hand column on the keyboard 2 provides the function keys 13, which, for example, may include a change balance due and no sale key, a total key, an add or grocery key, etc.

The computing mechanism of the machine is motor driven and includes a cyclically operable main cam shaft 31 (FIGURE 2), driven by a cyclic clutch (not shown) under control of the department keys 12 and the function keys 13, depression of any of which will initiate a cycle of operation of the machine.

Figure 2:
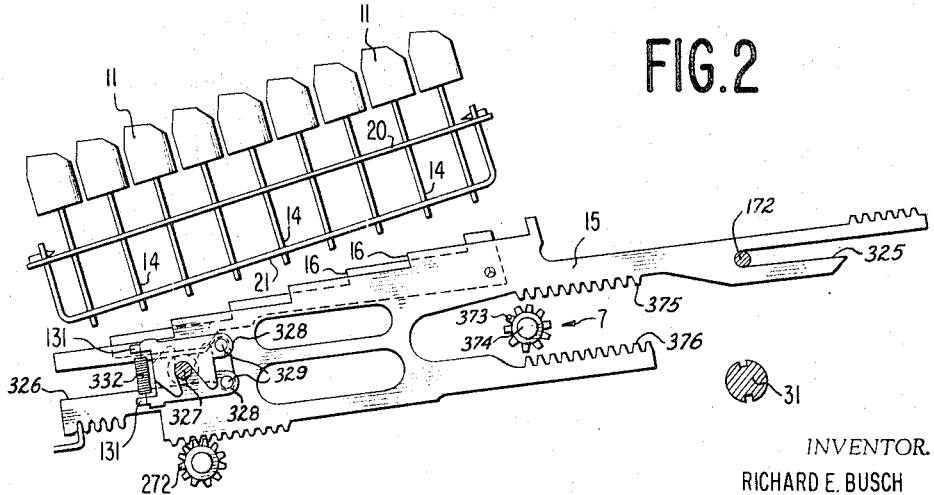
FIGURE 2 is a longitudinal section of the machine illustrating the racks, keyboard and associated elements.

FIGURE 2 shows the general construction of the keyboard which is substantially identical to the basic keyboard mechanism in the well-known "Clary" adding machine. Each of the amount keys 11 of the keyboard includes a key stem 14 guided for vertical movement in aligned slots formed in keyboard frame plates 20 and 21. The lower edges of the key stems cooperate with spaced shoulders 16 formed on aligned racks 15 to limit the forward advancement of each rack to a number of increments corresponding to the numerical value of the key depressed.

Spring means (not shown) are provided for normally holding the keys in raised position and means associated with the keyboard control slides are further provided for latching each key in rack arresting position upon depression thereof. A zero stop (22 shown FIGS. 7–13 and 15–17) which arrests each associated accumulator rack 15 and which is released by depression of any key in the respective column is also provided.

Means (not shown) associated with the main cam line are provided for yieldably advancing the racks 15 during the first half of a machine cycle and for returning them to their home positions after a printing operation and during the latter half of the machine cycle. The racks are provided with slots 325 and 326 which are slidably guided over support shafts 172 and 327, respectively. The shaft 327 is slidably mounted in suitable guide slots (not shown) in the frame of the machine.

In order to yieldably advance the various racks, each rack has opposed notches 328 located at the closed end of its slot 326, the notches being normally engaged by rollers 329 carried by pawls 131 pivotally mounted on the shaft 327. A tension spring 332 extends between each pair of pawls so as to urge the latter outwardly and thus hold the rollers 329 in driving engagement with the notches 328, thereby yieldably advancing any racks which are otherwise free to do so. When any one of the racks 15 is arrested at a shoulder 16 (FIG. 2) by a depressed amount key stem or by a zero stop (not shown FIG. 2), the rollers 329 will ride out of the notch 328 of the blocked rack and along the edge of the slot 326.

The primary accumulator 7 is basically disclosed in the aforementioned Drake Patent No. 2,472,696. Reference may be made to said patent for a complete disclosure of details of the accumulator not specifically shown herein. In general, the primary itemizing accumulator 7 comprises a plurality of accumulator gears 373 independently mounted on an accumulator shaft 374. For the purpose of raising the accumulator 7 from its neutral position shown in FIGURE 2 into its upper position when the accumulator gears 373 mesh with the upper rack gear sections 375 of the associated racks or lowering the unit wherein the gears 373 mesh with the rack gear sections 376, the present invention provides an accumulator positioning mechanism which will be described in greater detail in conjunction with FIGURE 19.

The machine embodying the instant invention is also provided with a plurality of department accumulators 10 and 10' (FIGURE 3) which are digitized on the return stroke of the upper rack 15. The accumulators 10 and 10' are positioned on shafts 6 and 6', respectively, with four accumulators provided on each shaft for each amount column. The manner in which an individual accumulator is selected for digitation during a given cycle of operation is disclosed in aforementioned copending application Ser. No. 388,900.

The department accumulators are digitized by a lower accumulator rack 273, positioned in each amount column (FIGURE 3). The main accumulator rack 15 digitizes the itemizing accumulator 7 through gear 373 of the reversible type on the rack forward stroke to the left and also, through an idler gear 272, drives lower main rack 273 on its initial stroke to the right. The rack 273 has slidably mounted on the other side thereof a transfer rack 276 and a rack 276', which serve to digitize the department accumulators 10 and 10'. During the forward stroke of the upper rack 15 and corresponding initial rearward stroke of the lower rack 273, the lower accumulator 10 and 10' are retained in their neutral position in engagement with their respective detent bars 277 and 278. During the latter half cycle of machine operation and before the racks 15 begin their homeward stroke, one of the accumulator shafts 6 or 6', or both, depending upon the department key selected, will raise the associated accumulator gear from its detent bar and into mesh with the transfer rack 276 and/or 276' (FIGURE 3).

As the rack 15 begins its homeward stroke, the lower transfer rack 276 will digitize its respective accumulator gear. It should be noted that the lower accumulators are digitized on the back stroke of the upper rack 15 and therefore the additional accumulator loads do not hinder the digitation of the reversible accumulator 7 by the upper rack. In addition, no transfer spring load is applied to the main rack in the home position and no extra motion of the main racks is needed for transfer. Also, additional secondary accumulators may be provided by merely extending the length of the transfer rack 273 and providing additional accumulator shafts.

During the digitizing stroke of the rack 276, should a tens transfer become necessary, a double width tooth 269 is provided on the accumulator gears 10 and 10', as illustrated in FIGURE 4. A pivot arm 281 is rockably mounted upon shaft 282 in proximity to each of the accumulator gears and contains a camming tooth 283 which is positioned in the same plane as the double width tooth 269 of the accumulator gear and is biased by spring 284 in contact with the accumulator gear so that when the double width tooth strikes the camming tooth 283 on pivot arm 281, the pivot arm will rock counterclockwise about the shaft 282. The pivot arm 281 normally latches the bail 261 of the next higher order which is pivotally mounted upon shaft 285. When the transfer latch bail 261 is released by pivot arm 281, it will pivot in a counterclockwise direction about the shaft 285 in response to the bias provided by spring 286, which extends between the bail 261 and a framing pin 287. The bail 261 will rotate in a counterclockwise direction to a position determined by the stop 268 which will be effective to produce a tens transfer in the accumulator of the next higher order.

As seen in FIGURE 3, as the transfer rack 276 nears its home position, a lever 288 loosely pinned to the lower rack 273 at 289 will strike a projection 290 on the bail 261 thereby rocking the lever 288 in a clockwise direction, which will therefore release the transfer rack 276 which it previously held latched in position against the bias of spring 291 which is connected between a pin 292 on lower rack 273 and a pin 294 on transfer rack 276. The clockwise rotation of lever 288 against the bias of spring 295 lifts the latching projection 296 on lever 288 from the path of the shoulder 297 from transfer rack 276 allowing the transfer rack 276 to move under the action of spring 291 one increment to the left determined by pin 298 mounted on the transfer rack 276 sliding within the slot 299 in the lower rack 273. Movement of the transfer rack 276 one increment to the left advances the accumulator gear in engagement with the transfer rack by one tooth.

Relatching of the transfer mechanism occurs during the first part of the following cycle during the time used to mesh the working accumulator in 10 and/or 10'. It is effected by movement of a rack support shaft 300 connected at its neck 219 to the working accumulator positioning mechanism (FIGURE 20) at hook lever 220. Movement of the rack support shaft 300 to the right as seen in FIGURE 3 will drive a bar 301 mounted on the rack 276 to the right so that the lever 288 under the influence of its spring 295 will snap down over the shoulder 297 relatching the rack 276. At the same time, the shaft 285 will rotate clockwise as the lever 288 contacts the projection 290 of the bail 260 so that the bail will be rotated in a clockwise direction downwardly to be relatched by the pivot arm 281.

During a subtotal or a total operation, the shaft 282, which carries pivot arm 281, will rotate clockwise bringing the edge of its slot next to the key of the pivot arm 281 thereby preventing said arm from rotating, therefore acting as a zero stop during these aforementioned operations. It is pointed out at this time that clockwise rotation of the lower accumulators produces a total operation whereas counterclockwise rotation of the accumulators produces an add operation. The lower accumulators will produce a total, a non-total or an add operation, but will not produce a subtraction operation.

Figure 5:
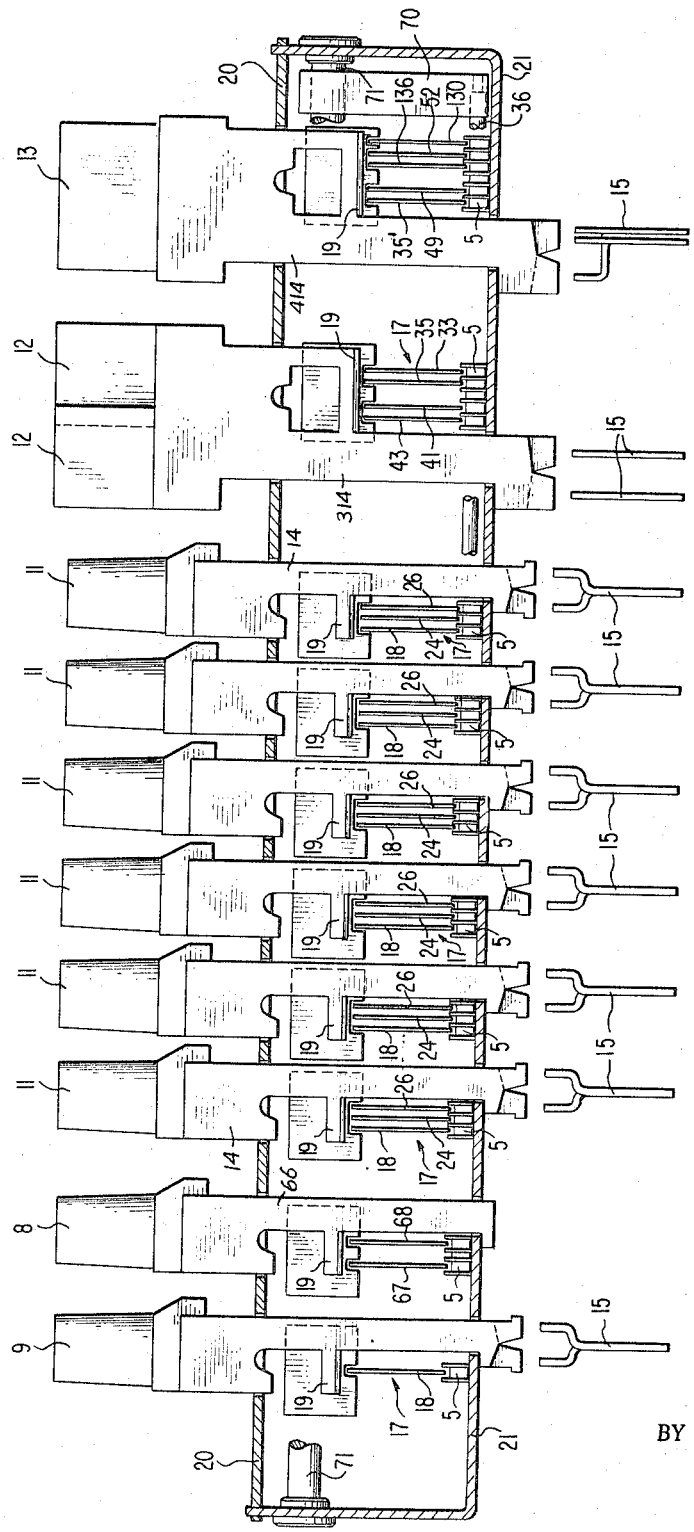
FIGURE 5 is a transverse cross section of the keyboard of the machine illustrating the various positions of the control slides.

In accordance with the present invention, as seen in FIGURE 5, an assortment of control slides are positioned in notches 17 of respective key stems 14, 66, 314, and 414 of each column of keys on the keyboard. These control slides control certain routines of keyboard entry, there being a different assortment of slides for different columns of keys dependent upon the functional operation of that particular column.

FIGURE 5 discloses a front section view of the keyboard illustrating the relationship between each group of control slides and the respective column of keys. Each group of slides is mounted on respective support members 5 which provide individual sliding channels for each of the control slides insuring separation of the slides and free movement thereof in the longitudinal direction. Each of the key stems 14 et cetera in each column of keys is provided with a projection in the form of an actuating shoulder 19 which is positioned transversely to the key stems immediately above the control slides associated with the particular key stem. As will become clearer as this description proceeds, the pressing of a key will force the actuating shoulder in a downward direction against each of the control slides positioned in the respective notches 17 of the keys thereby providing selective actuation of the keys in a direction and to an extent determined by various camming surfaces provided on the control slides.

Beneath each column of amount keys 11 there is provided three slides, of which the first is the key latch and zero stop control slide 18 illustrated in detail in FIGURE 6. The control slide 18, which is included also in the column of identification keys 9, latches the shoulder 19 of a depressed amount key stem or identification key stem 14 under a lip 25 provided on each projection 27 of the slide 18. The projections 27 provided for each key of a column in the amount section and identification section each include over lip 25 a camming surface 28 which effects a shifting of the slide 18 to the left in response to depression of one of the amount keys 11 or identification keys 9. The control slide 18 under the rightward bias of spring 31 not only provides for latching of the amount keys and identification keys but also effects control of the zero stop 22. The sliding movement of the control slide 18 during the latching of the stem 14 will allow the zero stop stem 22 to escape from beneath a shoulder 23 on the slide, thereby rendering the zero stop for that particular column of keys ineffective to restrain the particular accumulator rack 15 associated with that column.

A zero bail 69, provided adjacent a projection 146 on the lower portion of slide 18, is actuated by the accumulator positioning mechanism during total, subtotal, read and reset operations to clear the zero stop stem 22 by shifting each of the slides 18 in the amount columns. The zero bail 69 is also controlled by the clear key to release amount keys and identification keys incorrectly depressed.

The second control slide in the group associated with each column of amount keys is a full stroke slide 24 illustrated in FIGURE 7. The full stroke slide 24, at the beginning of a machine cycle, shifts to the left to hold the shoulder 19 of a depressed key stem under a respective hook 227 formed on individual projections 228 of the slide 24. Movement of the slide 24 is controlled by a bail 36 riding between a pair of projections 62 on the lower portion of the slide 24, and movement of the bail 36 is in turn provided by other control slides and also by mechanisms associated with the accumulator positioning device, so that slide 24 not only prevents depressed keys from raising and accidental depression of other keys during the machine cycle, but also, should a key be only partially depressed, the hook 227 for blocking extending longitudinal like slide 24 will strike the key stem, as illustrated by the partially depressed key in FIGURE 7, preventing movement of the slide 24 and of the bail 36 until the key is depressed to its full extent. As will be described hereinafter, a blocking of movement of the bail 36 so connected to slide 24 prevents operation of the machine.

The third slide of each group associated with the amount keys is an amount interlock slide 26 illustrated in FIGURE 8. The slide 26 is actuated by bail 34 so that during a total, subtotal, read or reset operation, one of the points A, B or C on each of a plurality of projections 30 is positioned beneath the respective key stems thereby preventing depression of the amount keys during any of these operations. The bail 34 is controlled by the department accumulator positioning mechanism, as shown in FIGURE 9, so that engagement of the accumulator 10 or 10' with the rack 276 or 276' produces coordinated shifting of the slide 26, thereby preventing depression of the amount keys, and additionally, if amount keys have been depressed, slide 26 and its slots 32 will be locked and bail 34 will prevent depression of certain department and function keys.

Beneath each column of department keys 12 is located a group of four slides which are positioned in openings or notches 17 in the key stems 314 in a similar manner as the control slides associated with the amount columns. The first slide of the department key group is a department interlock slide 33 which is illustrated in FIGURE 9. The department interlock slide 33 is actuated by the bail 34 positioned between projections 60 in the bottom side of the slide. The bail 34 is controlled by the accumulator controls so that during a desired operation of the machine, the department keys 12 may or may not be depressed due to projections 37 blocking the actuating shoulder 19 of the key stem, depending on the particular operation to be performed.

The second slide of the group is a clutch trip and key hold-down slide 35 illustrated in detail in FIGURE 10. The slide 35 is provided with a plurality of diagonal slots 38, each positioned below a respective key stem shoulder 19. As a department key 12 is depressed, the slide 35 will be cammed by the camming surface 39 of the slot 38 to the left as shown in the figure, thereby effecting movement of bail 36 which is mounted between a pair of projections 61 on the lower portion of the slide. As indicated above, the bail 36 also actuates the full-stroke slide 24 in the amount key section, and, as will be set forth hereinafter in connection with FIGURE 18, also provides for actuation of the clutch assembly thereby initiating a machine cycle. While the sloping configuration of the slots 38 will hold the key 12 in a depressed position, the plateau between the respective slots will prevent depression of a second key in that column.

The third slide in the department key group is a department column interlock slide 41 illustrated in detail in FIGURE 11. The slide 41 contains a plurality of projections 44, each associated with a respective key stem 314. The projections 44 have camming surfaces 42 which, when cammed by the shoulder 19 of the key stem being depressed, effect movement of the slide to a different position for each department key, thereby preventing depression of a second key in that department column. The selective movement of the slide for each key in the column results from the varying width of the projections 44 and the resulting variable spacing of the slots 45 between each of the projections.

The fourth slide in each department column is a department column itemizer control slide 43 illustrated in detail in FIGURE 12. The control slide 43 has two forms of camming surfaces 47 and 48 which effect selective movement of the control slide in one direction or another upon actuation of a particular department key 12. The camming surfaces 47 move the slide to the right, as seen in the figure, while the surfaces 48 cause slide movement to the left. These movements control, through a bail 46 and a linkage 51 (FIGURES 18 and 19), the mechanism which determines whether the working accumulator 7 is to receive an amount additively, subtractively, or is not be digitized at all. For example, a pair-out key or a credit key associated with the surfaces 48 will cam the control slide 43 to the left as seen in the figure, thereby effecting a subtractive entry into the accumulator whereas, a meat department key associated with one of the surfaces 47 would cam the slide to the right, as seen in the figure, to effect an additive entry into the accumulator. The particular manner in which the bail 46 actuates the linkage 51 (FIGURE 14) will be described in greater detail hereinafter.

Positioned in a notch 17 in the key stems 414 in each function column is a group of four control slides. The first of these control slides is the clutch trip and key hold-down slide 35', illustrated in FIGURE 10 and described above in connection with the department key section. This slide in the function column operates in an identical manner as the comparable slide in the department key section.

Figure 13:
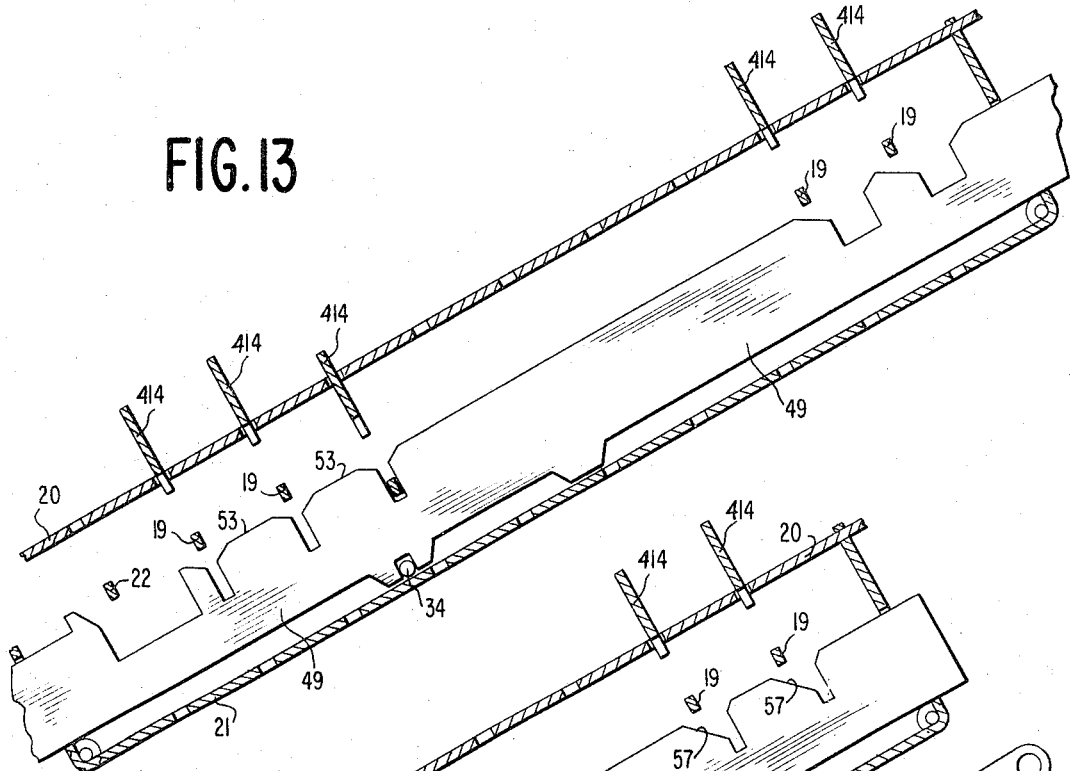
FIGURE 13 is a side section of the keyboard illustrating a function interlock slide.

A second slide in the function column group is a function interlock slide 49 which is illustrated in detail in FIGURE 13. The slide 49 is movable by means of the aforementioned bail 34 associated with the control slide 26 in the amount column and slide 33 (FIGURE 9) in the department column so that during a keyboard entry, certain function keys 13 may or may not be depressed depending upon previous entries in other sections of the keyboard, which will control the bail 34 through their respective slides. In a similar manner as slide 33, the slide 49 provides abutment surfaces 53 which will prevent depression of certain function keys after the slide 49 is moved by the bail 34. This will be effected during the machine cycle in a manner to be described hereinafter in connection with the accumulator control mechanism.

Figure 14:
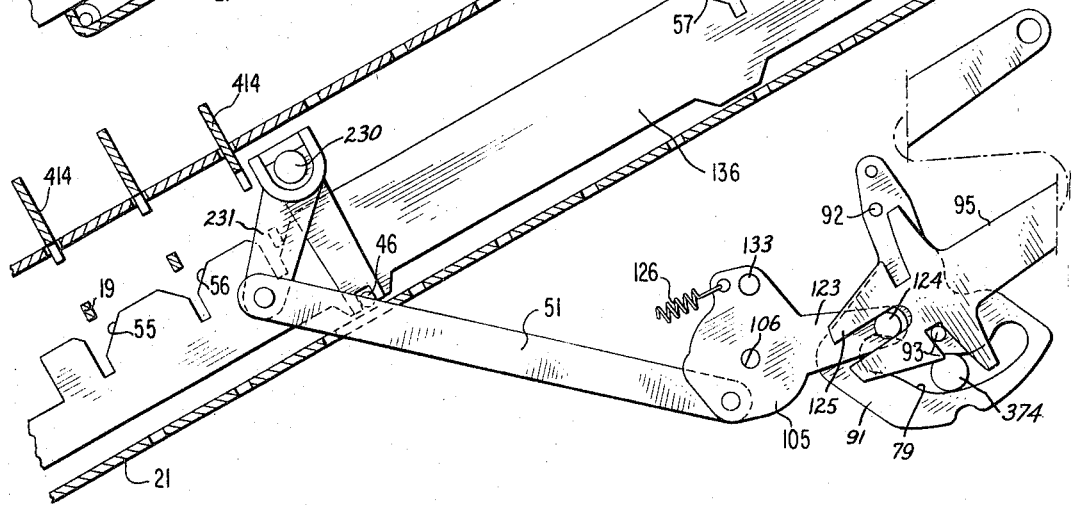
FIGURE 14 is a side section of the keyboard illustrating a function itemizer control slide and its association with part of the mechanism of FIG. 19.

The third slide in the function column is an itemizer control slide 136 illustrated in FIGURE 14. The control slide 136 selects the particular mode of operation, such as adding, subtracting or non-add to be performed in the working accumulator from the depression of a function key. The depression of a function key will, through the striking of a respective cam surface 55, 56 or 57 move the slide as shown in the figure to the right, to a neutral position column or to the left, respectively, whereby through the bail 46 and link 51, the accumulator will be shifted to the proper position for the particular function desired, as will be described in greater detail in conjunction with FIGURE 19.

Figure 15:
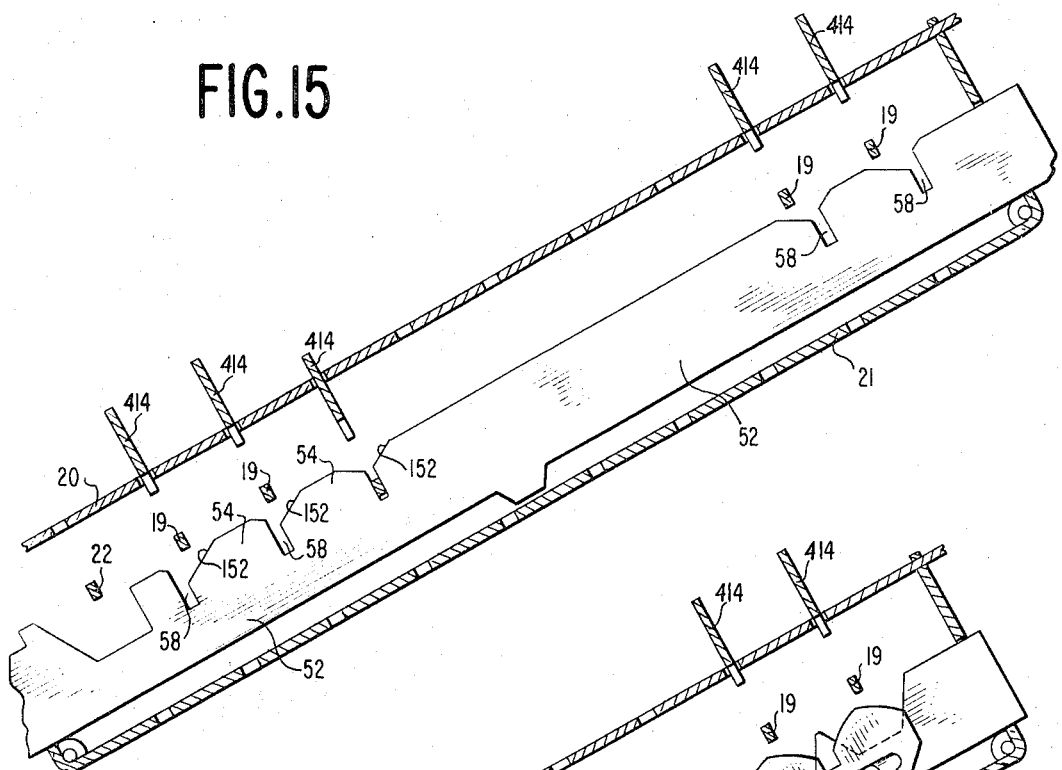
FIGURE 15 is a side section of the keyboard illustrating a function interlock slide.

The fourth slide in the function column is function interlock slide 52 illustrated in FIGURE 15. The interlock slide 52 is very similar in construction and purpose to the slide 41 described in connection with the department column interlock in that it contains a plurality of projections 54 having a camming surfaces 152 which will move the slide to a different position for each function key 13 thereby preventing the depression of another function key. Again the variable width of the projections 54 and consequent variable spacing of the slots 58 in the slide 52 different than the key spacing are responsible for the differential movement of the slide in response to depression of a selective key.

In addition to the above-mentioned groups of control slides, there is provided in the column containing the amount release key 8 a zero stop control and clear key slide 67, which, as seen in FIGURE 16, moves to the left in response to pressure of the shoulder 19 of clear key stem 66 on the camming surface 69, which through bail 59 releases depressed amount keys. The clear key locking slide 68, shown in dash lines in FIGURE 16, is controlled by the bail 36 such that movement of the bail to the left will effect movement of the slide 68 to the left bringing a shoulder 65 under the shoulder 19 of clear key stem 66 thereby preventing depression of the clear key during a machine operation.

Figure 17:
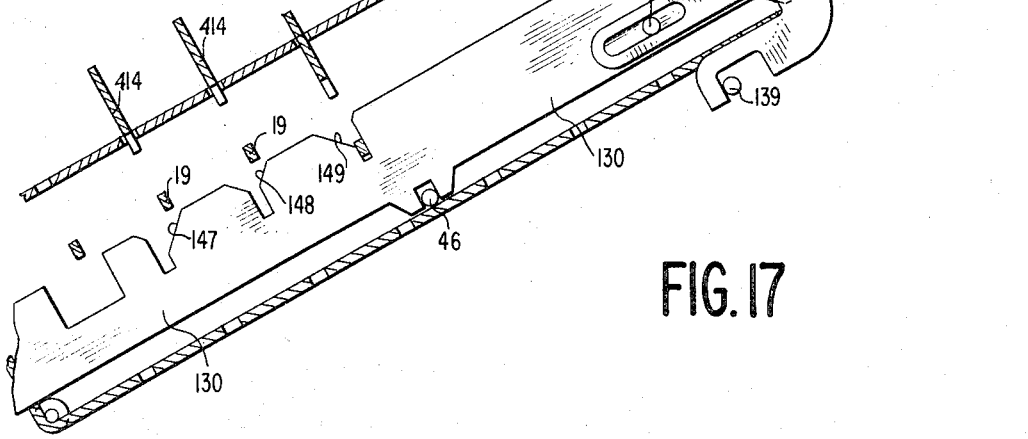
FIG. 17 is a side section of the keyboard illustrating a change computer slide.

Also provided in the function column is a change computer slide 130, illustrated in FIGURE 17. The slide 130 provides a plurality of camming surfaces 147, 148 and 149 which effect an add, non-add and subtract function, respectively, via the bail 46. The slide 130 also provided with a slide 138 slidably mounted on pins 137 fixed to the slide 130. The secondary slide 138 operatively associated with bail 139 connected to a symmetry rack (not shown) beneath the function column is actuated by an end-around carry mechanism determining operation in either the credit or debit area.

As indicated previously the slides 35, 43 and also 35' and 136 in the department and function columns, control and actuate the accumulator positioning mechanisms and the clutch trip mechanism through the various bails 46 and 36.

Figure 18:
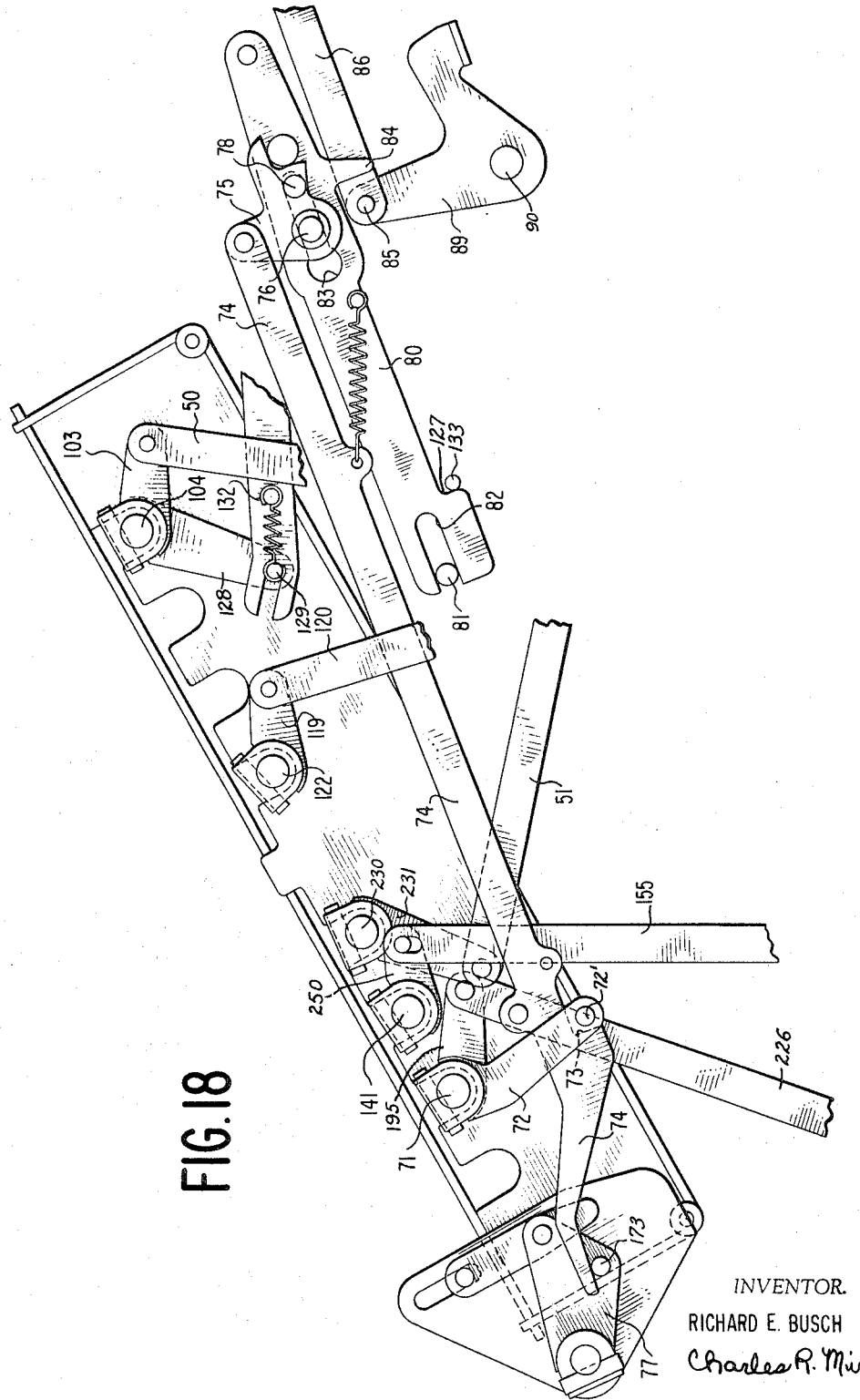
FIGURE 18 is a side section of the keyboard illustrating the clutch trip mechanism and the various control linkages actuated by the keyboard control slides.
Figure 23:
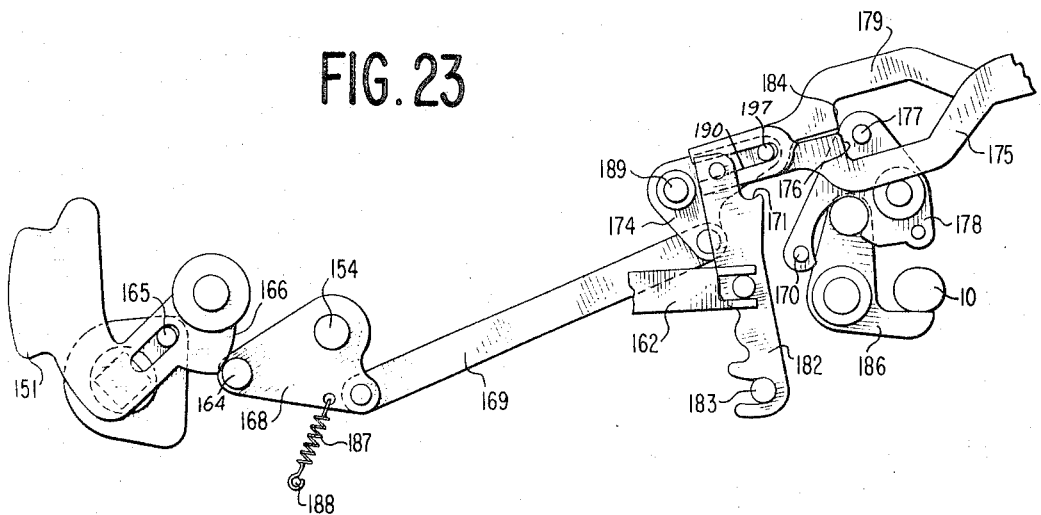
FIGURE 23 illustrates still another actuated position of the mechanism of FIGURE 20.
Figure 24:
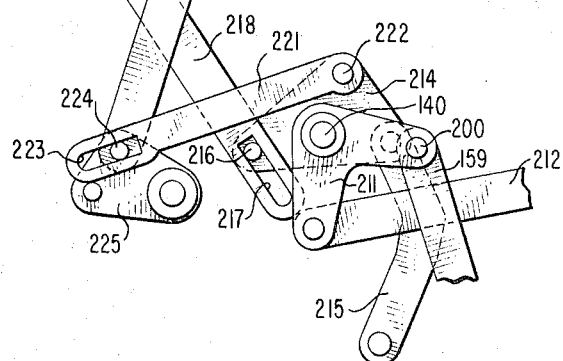
FIGURE 24 illustrates the linkage which controls operation of the zero bail during read and reset operation of the department accumulators.

The aforementioned bail 36, which is actuated by the clutch trip slide 35, has loosely mounted at one end thereof an arm 70 (FIGURE 5) securely mounted to a shaft 71 which is rotatably mounted in the machine side frames, also seen in FIGURE 18. The shaft 71 carries rigidly mounted at its extreme end an arm 72 having a pin 72', which lies adjacent shoulder 73 of clutch trip arm 74. As the slide or 35' (FIGURE 10) is moved by a respective department or function key, it carries the bail 36 to the left as seen in FIGURE 10, and through the arm 70 effects rotation of the shaft 71 in a clockwise direction so that the pin 72' will engage the shoulder 73 of the clutch trip arm, driving the arm 74 to the left to effect initiation of a machine cycle.

Looking now more particularly to the upper accumulator positioning and engaging mechanism, the accumulator 7 is raised and lowered to mesh the accumulator gears 373 with either the upper rack gear section 375 or the lower rack gear section 376 of the drive racks 15 depending upon the type of operation to be performed. For this purpose, a mechanism is provided which is under the control of the different control slides for determining and effecting the positioning of the accumulator.

Looking specifically to FIGURES 18 and 19, the clutch trip arm 74 is connected at its right hand end to a bell crank member 75, securely mounted upon a pivot pin 76 which, in turn, extends through slot 83 in power trip slide 80. The other end of the clutch trip arm 74 is supported upon a pin 173, mounted upon rotatable plate 77. The bell crank member 75 provides a pin 78 which also rides in slot 83 of power trip slide 80. The power trip slide 80 is supported at one end by a pin 81 positioned within slot 82 in the slide 80, the pin being securely mounted on link 112 (FIGURE 19). The slide 80 is also supported by pivot pin 76 of bell crank member 75 which is surrounded by slot 83 such that rotation of bell crank member 75 by clutch trip arm 74 will serve to rotate the slide 80 about the pivot pin 76 of 75 thereby rocking the link 112 downwardly preparatory to releasing the zero stop mechanism 118, as will be described. The power trip slide 80 provides a projection 84 in registration with a pin 85 associated with the power trip lever 86, which, as seen in FIGURE 19, actuates a bell crank member 87 in a counterclockwise direction to trip the power switch 88 effecting application of power to the machine. The pin 85 is also associated with a clutch dog 89, which when rotated by projection 84 counterclockwise at the same time about its support shaft 90 effects engagement of the clutch (not shown).

A box cam 91 (FIGURE 19) carries a pair of pins 92 and 93 arranged on opposite sides of a frame pin 94 upon which the box cam 91 pivots. These pins are positioned to be selectively engaged by hook member 95 pivotally connected by pin 113 to a cam follower 96 having three arms 96a, 96b and 96c. The cam follower 96 is pivotally mounted on a shaft 97 along side of a cam follower 96' having two arms 96'a and 96'b. Each cam follower is urged counterclockwise by a spring 98 (only one being shown) tensioned between one arm 96c and 96'b of each cam follower respectively and a frame pin 99 to press rollers 100 and 100' on arms 96b and 96'a against cam 101 and 102 keyed on the main drive shaft 81 which rotates in a counterclockwise direction. Cam 101 is a "total" cam and has a high portion 101a extending over substantially half of its periphery whereby to rock the cam follower 96 causing pin 167 to move to the left in bent slot 134 when the link 132 is normally spring biased. It also moves hook member 95 rearwardly—to the right—during approximately the first half of a machine cycle. Cam 102 is a "sub-total" cam with a high portion of 102a effective further on in the cycle so that when link 132 is shifted to the right by linkage 50, its pin 167 in straight slot 135 of cam follower 136' is shifted to the right into the matching part of the other slot by both followers in unison to hold hook 95 to the right during the major part of the "sub-total" operation.

For the purpose of locating the hook member 95 in a lower, intermediate or upper position, a disc 105 is rotatably mounted on shaft 106 and is controlled by a link 51 connected to bail 46 on itemizer control slides 43 (FIGURE 12) and 136 (FIGURE 14) through shaft 230 and bell crank 231. The disc 105 carries a projection 123 which carries a stud 124 located in slot 125 of the hook member 95. Rotation of the disc 105 in either the counterclockwise or the clockwise direction causes rotation of the stud 124 and proportionate movement of the hook member 95 about the pivot pin 113 carried on arm 96a of the cam follower 96. The hook member 95 is therefore positioned by disc 105 with regard to the pins 92 and 93 carried by the box cam 91 so as to engage either with the pin 92 or the pin 93, or to engage both pins and thereby provide a non-add situation. With the hook member 95 engaging one of the pins 92 or 93, a rocking of the cam follower 96 will effect rotation of the box cam 91 in either a clockwise or a counterclockwise direction providing through cam groove 79 either additive or a subtractive situation for primary itemizing accumulator shaft 374, respectively.

The disc 105 also carries a pin 133 (FIGURES 14, 15 and 16) which is urged by a spring 126 (FIGURE 14) in a counterclockwise direction against a shoulder 127 (FIGURE 18) of the power trip slide 80. Rotation of the disc 105 is effected by longitudinal movement of the power trip slide 80 during rotation of the clutch dog 89 by the projection 84 and actuation of the clutch and power trip lever 86 provided the link 51, which controls the positioning of the hook member 95, does not retain the disc 105 in another position.

The shaft 104 (FIGURE 18) which is controlled by the total and subtotal keys in the function column is also connected to a bell crank 128 which through stud 129 and link 132 is connected to the three arm cam follower 96 and follower 96' (FIGURE 19) at pin 167 and serves to lock up the cam followers by moving pin 167 to the right during a subtotal operation so as to effect engagement of the accumulators for both cycles of the accumulator racks.

When a total or subtotal is desired, depression of the subtotal key or total key in the function section will cause actuation of the control link 50 through the bell crank 103 shown in FIGURE 18. The bell crank 103 will pivot about a shaft 104 in a respective direction, clockwise for subtotal and counterclockwise for total which will in either case cause the link 50 to rock an arm 110 counterclockwise about shaft 106 by means of one or the other of one pair of studs 107 carried by the arm 110 contacting one of two lateral projections 108 on the control link 50. A pin 109 mounted on lever arm 110 rides in slot 111 in link 112. As the lever arm 110 rotates, it effects a downward pivoting of the link 112 about a stud 113 located on arm 96a of the three arm cam follower 96. A shoulder 114 of the link 112 will, after the link is moved to the lower position, be in the plane of a stud 115 mounted on a rockable disc 116 and as the cam follower 96 is rocked by the cam 101, the shoulder 114 will, through the stud 115, rock the disc 116 clockwise about its pivot pin 229, which through a link 117 will pull the accumulator zero stop mechanism 118, freeing the box cam 91 for rotation. Rocking of the disc 116 also effects counterclockwise rotation of a bell crank 119 (FIGURE 6) by means of a lever arm 120 (FIGURES 6 and 19) connected to the disk 116 at stud 121, and through the bell crank 119 and a shaft 122 effect movement of the bail 34 and consequent shifting of the interlock slides 26 (FIGURE 8, 33 (FIGURE 9) and 49 (FIGURE 13) in the amount, department and function sections, respectively, thereby preventing depression of the keys in these sections during the machine cycle.

The mechanism for positioning the lower accumulators 10 and 10' is illustrated in FIGURES 20 through 24. Cams 149 and 151 (FIGURE 20) operate through selector locks (not shown) to condition the machine for a read or reset operation. The cam 149, representing a read operation, is rotated in a counterclockwise direction by means of a pin 152 connected to one member of the lock actuating assembly. A cam surface 150 on the cam 149 will rotate a cam follower 153 clockwise about its pivot shaft 154. The follower 153 has pinned thereto a link 155 connected to a bell crank 250 (FIGURE 18) which rotates a shaft 141 causing shifting of the bail 34 associated with control slides 26, 33 and 49. The bail 34 in turn will move the interlock slide 26, 33 and 49 into a position where none of the keys in the amount section can be depressed, while in the department section, depression of department keys is permitted if neither the subtotal or total keys in the function section have previously been depressed. In the function section, the slide will be moved so that only the subtotal or total key can depressed, and this will be possible only if none of the keys in the department section have previously been depressed.

The follower 153 has connected thereto a second link 156 which, when the follower is rotated, rides to the left over a guide pin 157. A spring 158 is connected between the link 156 and a pin 160 on sword fish 159. When the link 156 is moved to the left through rotation of the cam follower 153, the spring 158 will rock the sword fish 159 to the left until it is in alignment beneath a pin 161 mounted on a rotatable disc 163, as seen in FIGURE 21.

It should be noted that the machine requires two cycles to reset or read a department total. The first cycle is for positioning the desired accumulator beneath the racks and the second cycle is for the actual read and printing of the total and subtotal, or reset operation.

The extreme end of the sword fish 159, opposite the pin 161, is connected at 200 to a pivot arm 211 rotatable about stationary shaft 140. The pivot arm 211 is rocked through link 212 by the main cam line 213 via a cam follower 196 which also moves hook lever 220 acting on shaft 300 at its neck 219.

The cam 149 having been set, counterclockwise rocking of the pivot arm 211 by the main cam line 213 actuates the sword fish 159 during read operation so as to effect clockwise rotation of the rotatable disc 163 through contact with the pin 161. A link 162, pinned to the disk 163 at 180, will thus rock a latch arm 182 about pivot pin 183 into the path of a latch pin 170 mounted on an accumulator engaging cam 178.

A selector link 179, connected at one end to the cam follower 191 like 181, has a latching surface 184 which lies in the same plane as a pin 177 which is also mounted on the accumulator engaging cam 178, and is rotatable with cam 178 about pivot shaft 185. When the main cam 213 rocks the cam follower 191, the surface 184 will strike the pin 177 rocking the cam 178 clockwise thereby rotating bell crank 186 about pivot axis 186' in a conuterclockwise direction to lift shaft 6 and mesh the accumulator 10 with the racks and at the same time latch the pin 170 on a surface 171 (FIGURES 22 and 23) of the latch arm 182 which will hold the accumulator in mesh during the last half of the first cycle and the first half of the second cycle.

The latch arm 182 will, in the first half of the second cycle, be released by the machine mechanism so that later in the cycle when the selector link 179 is rocked back to its home position, the engaging cam 178 will be allowed to rotate back to its rest position, demeshing the accumulator from the racks.

The cam 151, which conditions the machine for a reset operation via a selector lock (not shown), is rotated in a counterclockwise direction through a pin 165 mounted on the other member of the selector lock actuating mechanism. A cam surface 166 of the cam 151 will rotate the cam follower 153 to perform the same functions described above in connection with the cam 149 with the exception that a selector link 175 connected to a cam follower 181 which engages a separate cam on the main cam line 213 will be moved into the plane of the pin 177 so that the accumulator 10 will be demeshed from the racks a half cycle earlier for the reset operation than for the read operation.

The means for changing the positions of the selector links comprises a cam follower 168 the roller 164 of which is urged against the camming surface 166 of cam 151 by a spring 187 connected to a frame pin 188. A link 169, connected between the follower 168 and a pivot arm 174 (FIGURES 20 and 23) will pivot the arm 174 about pivot shaft 189 in a counterclockwise direction so that the pin 197, which passes through slots 190 in the end of the links 175 and 179 will lift the links upward, placing the latching surface 176 of the link 175 in the same plane as the pin 177. When the cam follower 191 is rocked by the main cam 213 the link 175 will be actuated so that the latching surface 176 will strike the pin 177 rotating the accumulator engaging cam 178 in a clockwise direction and the bell crank 186 in a counterclockwise direction thereby engaging the accumulator with the rack; however, the accumulator will be demeshed from the racks a half cycle earlier because the link 175 is controlled by a different cam on the line 213.

A second pivot arm 214 is also mounted on the bell crank shaft 140 and is connected at one end to the rockable disc 163 through a link 215. The other end of the pivot arm 214 carries a stud 216 which rides in a slot 217 of a link 218. The link 218 is connected at its opposite end via bell crank 198 (FIGURE 24) and rotatable shaft 199 to the zero bail 69 of FIGURES 6 and 16 by suitable mechanism (not shown). The control of the zero bail during a read and reset operation comes about because the department accumulators are engaged later in the cycle while the racks will tend to move early in the cycle with the itemizing accumulator in mesh. In a normal cycle the zero stops 22 are released through a link 120 (FIGURE 18) but during a read or reset cycle, the link 218 will not allow them to release until the department accumulators 10 and 10' are also meshed. A link 221 (FIGURE 24) is loosely mounted to a stud 222 on arm 214 and its other end has a slot 223 which surrounds a stud 224. The stud 224 is mounted on a pivotal block 225 and at stud 224 block 225 also has connected thereto a link 226 which is connected through a bell crank 195 and pivotable shaft 71 to the bail 36 which controls the tripping of the clutch mechanism.

The selector locks are so positioned with relation to the block 225 that if the locks are not rotated to their full position they will interfere with the block 225, preventing depression of a department key and therefore preventing release of the clutch through the link 226. Also, if a department key is depressed, the block 225 will prevent rotation of the lock.

The link 221 upon rotation of a lock and depression of a department key will through the disc 163, link 215, arm 214, and stud 222 be rocked to hold the link 226 down until the second cycle has begun thereby preventing the clutch from disengaging at the end of the first cycle.

I claim:
1. In a calculating machine of the cash registering type having a plurality of primary differential actuators, a plurality of accumulator elements respectively driven by said primary differential actuators an extent representative of a numerical value, and means for driving said differential actuators through incremental amounts relating to said numerical values, the improvement consisting of a plurality of secondary differential actuators operably associated with said primary differential actuators for coordinate movement therewith, a plurality of secondary ac- cumulator elements, means for positioning said secondary accumulator elements in operative relationship to a respective secondary differential actuator comprising cam means for shifting said secondary accumulator elements to their operative position in contact with a respective secondary differential actuator, first selector linkage means associated with said cam means for effecting actuation thereof in response to machine operation, second selector linkage means normally inoperative to effect actuation of said cam means, actuating means for simultaneously shifting said first selector linkage means out of operative association with said cam means and for shifting said second selector linkage means into association with said cam means, said second selector linkage means being operative to engage said cam means for a longer time than said first selector linkage means.

2. In a calculating machine of the cash registering type having a plurality of primary differential actuators, a plurality of accumulator elements respectively driven by said primary differential actuators an extent representattive of a numerical value, and means for driving said differential actuators through incremental amounts relating to said numerical values, the improvement consisting of a plurality of secondary differential actuators operably associated with said primary differential actuators for coordinate movement therewith, a plurality of secondary accumulator elements, means for positioning said secondary accumulator elements in operative relationship to a respective secondary differential actuator comprising cam means actuatable in one direction for shifting said secondary accumulator elements to their operative position in contact with a respective secondary differential actuator, first selector linkage means normally associated with said cam means for effecting actuation thereof in response to machine operation, second selector linkage means normally inoperative to effect actuation of said cam means, both said linkage means including a longitudinal link longitudinally movable to effect said cam actuation, actuating means for simultaneously shifting said first selector linkage means transversely out of operative association with said cam means and for shifting said second selector linkage means in the same transverse direction into association with said cam means, said second selector linkage means being operative to engage said cam means for a longer time than said first selector linkage means, normally inoperative latching means for holding said cam means and thereby retaining said secondary accumulators in contact with their respective secondary differential actuators upon actuation of said cam means, and means for selectively shifting said latching means into operative position to retain said secondary accumulator elements in contact with respective secondary differential actuators in response to machine operation.

3. In a calculating machine of the cash registering type having a keyboard, a plurality of primary differential actuators, a plurality of accumulator elements respectively driven by said primary differential actuators an extent representative of a numerical value, and means for driving said differential actuators through incremental amounts relating to said numerical values, the improvement consisting of a plurality of secondary differential actuators operably associated with said primary differential actuators for coordinate movement therewith, a plurality of secondary accumulator elements, means for positioning said secondary accumulator elements in operative relationship to a respective secondary differential actuator comprising cam means for shifting said secondary accumulator elements to their operative position in contact with a respective secondary differential actuator, first selector linkage means associated with said cam means for normally effecting actuation thereof in response to machine operation, second selector linkage means normally inoperative to effect actuation of said cam means, actuating means for simultaneously shifting said first selector linkage means out of operative association with said cam means and for shifting said second selector linkage means into association with said cam means, said second selector linkage means being operative to engage said cam means for a longer time than said first selector linkage means, said actuating means including latching means for retaining said secondary accumulators in contact with their respective secondary differential actuators upon actuation of said cam means, and keyboard interlock means associated with said actuating means for preventing machine operation under predetermined conditions of keyboard control.

References Cited
UNITED STATES PATENTS

| | | |
|---|---|---|
| 2,503,865 | 4/1950 | Christian. |
| 2,647,687 | 8/1953 | Parsons et al. 235—60 |
| 2,696,944 | 12/1954 | Goodbar et al. 235—60 |
| 2,741,426 | 4/1956 | Golemon 235—6 |
| 2,755,993 | 7/1956 | Christian et al. 235—60.48 |
| 3,010,647 | 11/1961 | Boyden et al. 235—60.13 |
| 3,070,294 | 12/1962 | Lapointe 235—60 |
| 3,089,641 | 5/1963 | Fettig et al. 235—60.13 |

FOREIGN PATENTS

| | | |
|---|---|---|
| 550,249 | 12/1957 | Canada. |

STEPHEN J. TOMSKY, *Primary Examiner.*